(12) United States Patent
Tsuchida et al.

(10) Patent No.: US 10,557,547 B2
(45) Date of Patent: Feb. 11, 2020

(54) HYDRAULIC CONTROL DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenichi Tsuchida, Nishio (JP); Toshiaki Hayashi, Toyohashi (JP); Yoichiro Kimura, Anjo (JP); Syuji Moriyama, Nagakute (JP); Yoshinobu Soga, Toyota (JP); Hiromitsu Nitani, Okazaki (JP); Takafumi Inagaki, Kasugai (JP); Tetsuya Yamamoto, Toyota (JP)

(73) Assignees: AISIN AW CO., LTD., Anjo (JP); TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/079,842

(22) PCT Filed: Mar. 7, 2017

(86) PCT No.: PCT/JP2017/008990
§ 371 (c)(1),
(2) Date: Aug. 24, 2018

(87) PCT Pub. No.: WO2017/163855
PCT Pub. Date: Sep. 28, 2017

(65) Prior Publication Data
US 2019/0063598 A1    Feb. 28, 2019

(30) Foreign Application Priority Data
Mar. 25, 2016   (JP) .................. 2016-062198

(51) Int. Cl.
F16H 61/00   (2006.01)
F16H 61/4061   (2010.01)
(Continued)

(52) U.S. Cl.
CPC ........... *F16H 61/142* (2013.01); *F16H 59/72* (2013.01); *F16H 61/0009* (2013.01);
(Continued)

(58) Field of Classification Search
CPC ......... F16H 2061/0037; F16H 57/0435; F16H 61/4061; F16H 61/14
See application file for complete search history.

(56) References Cited

U.S. PATENT DOCUMENTS 8,262,527 B2 *  9/2012  Shimizu ................ F16H 61/061
                                                    475/134
8,715,138 B2 *  5/2014  Ishikawa ................ F16H 61/12
                                                    477/168
(Continued)

FOREIGN PATENT DOCUMENTS

JP    2002-286121 A    10/2002
JP    2016-8687 A      1/2016
(Continued)

OTHER PUBLICATIONS

Jun. 6, 2017 International Search Report issued in International Patent Application No. PCT/JP2017/008990.

*Primary Examiner* — Tisha D Lewis
(74) *Attorney, Agent, or Firm* — Oliff PLC (57) ABSTRACT

A hydraulic control device includes: a pressure regulation valve that regulates a hydraulic pressure of oil supplied from an oil pump; a discharge oil passage through which the oil discharged from a fluid coupling flows when a lockup clutch is disengaged; a lubrication oil passage that supplies the oil from the discharge oil passage to a location to be lubricated;

(Continued)

a return oil passage that returns the oil drained from the pressure regulation valve to a suction port of the oil pump; a connection oil passage that connects the lubrication oil passage and the return oil passage; and a flow direction regulation valve that is provided in the connection oil passage.

4 Claims, 3 Drawing Sheets

(51) Int. Cl.
| | |
|---|---|
| *F16H 61/14* | (2006.01) |
| *F16H 57/04* | (2010.01) |
| *F16H 59/72* | (2006.01) |
| *F16H 61/662* | (2006.01) |
| *F16H 61/02* | (2006.01) |
| *F16H 61/686* | (2006.01) |
| *F16H 59/38* | (2006.01) |

(52) U.S. Cl.
CPC ... *F16H 61/0025* (2013.01); *F16H 61/66272* (2013.01); *F16H 61/0206* (2013.01); *F16H 61/686* (2013.01); *F16H 2059/385* (2013.01); *F16H 2061/0037* (2013.01)

(56) References Cited

U.S. PATENT DOCUMENTS

| | | | |
|---|---|---|---|
| 8,886,427 B2 * | 11/2014 | Shimizu | F16H 61/0021 475/116 |
| 2002/0137587 A1 | 9/2002 | Futamura | |
| 2015/0082805 A1 * | 3/2015 | Zeiner | F01D 19/00 60/788 |
| 2015/0192150 A1 | 7/2015 | Matsushita et al. | |
| 2015/0232102 A1 | 8/2015 | Morino et al. | |

FOREIGN PATENT DOCUMENTS

| | | |
|---|---|---|
| WO | 2014/030528 A1 | 2/2014 |
| WO | 2014/057531 A1 | 4/2014 |

* cited by examiner

HYDRAULIC CONTROL DEVICE

TECHNICAL FIELD

The present disclosure relates to a hydraulic control device.

BACKGROUND ART

An automatic transmission device provided with a fluid coupling that has a lockup clutch is used. Regarding the above automatic transmission device, for example, Japanese Patent Application Publication No. 2016-8687 (JP 2016-8687 A) (Patent Document 1) discloses a technique of switching a path for supplying hydraulic pressure regulated by a pressure regulation valve (secondary regulation valve 66) to the fluid coupling (torque converter 7) so as to control a state (engagement/disengagement) of the lockup clutch (lockup clutch 7a) using a hydraulic control device. Patent Document 1 also discloses a technique of supplying oil discharged from the fluid coupling to a location to be lubricated (lubrication system 69) via a lubrication oil passage (lubrication oil passage 63j) when the lockup clutch is disengaged. Additionally, Patent Document 1 discloses a technique of returning the oil drained from the pressure regulation valve during pressure regulation to a suction port of an oil pump (second oil pump 62) via a return oil passage (63k).

When the hydraulic control device of Patent Document 1 is structured to return the oil drained from the pressure regulation valve during pressure regulation to the suction port of the oil pump as well as supply the oil to a location to be lubricated, the following problem occurs. Thus, by adopting the above structure, the fluid coupling and the suction port of the oil pump are in communication with each other. For example, when the vehicle is started after being stopped for a long time, the amount of oil in the fluid coupling is small and air remains in the fluid coupling. Thus, there is a possibility of the remaining air traveling through the oil passage and flowing into the suction port of the oil pump. When air flows in the suction port of the oil pump, there is a possibility of the discharge efficiency of the oil pump decreasing and noise being generated.

RELATED ART DOCUMENT

Patent Document

Patent Document 1: Japanese Patent Application Publication No. 2016-8687 (JP 2016-8687 A)

SUMMARY

Problem to be Solved

In the hydraulic control device, it is desirable to avoid inflow of the air within the fluid coupling into the suction port of the oil pump even when the structure that supplies the oil drained from the pressure regulation valve during pressure regulation to the location to be lubricated is adopted.

Means for Solving the Problem

A hydraulic control device according to the disclosure is a hydraulic control device which controls hydraulic pressure supplied to an automatic transmission device provided with a fluid coupling that has a lockup clutch, the hydraulic control device comprising: a pressure regulation valve that regulates a hydraulic pressure of oil supplied from an oil pump and supplies the oil to the fluid coupling; a discharge oil passage through which the oil discharged from the fluid coupling flows when the lockup clutch is disengaged; a lubrication oil passage that supplies the oil from the discharge oil passage to a location to be lubricated in the automatic transmission device; a return oil passage that returns the oil drained from the pressure regulation valve during pressure regulation to a suction port of the oil pump; a connection oil passage that connects the lubrication oil passage and the return oil passage; and a flow direction regulation valve that is provided in the connection oil passage, and that allows communication between the lubrication oil passage and the return oil passage when hydraulic pressure on the return oil passage side is higher than hydraulic pressure on the lubrication oil passage side by a pressure that is equal to or higher than a set differential pressure, and blocks communication between the lubrication oil passage and the return oil passage when differential pressure between hydraulic pressure on the return oil passage side and hydraulic pressure on the lubrication oil passage side is lower than the set differential pressure In this structure, when the lockup clutch is disengaged and the oil discharged from the fluid coupling flows through the discharge oil passage, the differential pressure between hydraulic pressure on the return oil passage side and hydraulic pressure on the lubrication oil passage side becomes lower than the set differential pressure. Thus, it is possible to separate the discharge oil passage and the lubrication oil passage that are in communication with the fluid coupling from the return oil passage that is in communication with the oil pump, since the flow direction regulation valve blocks communication. Therefore, even if air is mixed in the oil discharged from the fluid coupling, it is possible to make the oil mixed with air only flow through the lubrication oil passage so that inflow of air into the suction port of the oil pump can be avoided. When the oil from the fluid coupling does not flow through the discharge oil passage and hydraulic pressure on the return oil passage side is higher than hydraulic pressure on the lubrication oil passage side by a pressure that is equal to or higher than the set differential pressure, the flow direction regulation valve is opened. Thus, the oil drained from the pressure regulation valve can be supplied to the lubrication oil passage. In this case, it is possible to return a part of the oil drained from the pressure regulation valve to the suction port of the oil pump via the return oil passage.

Further features and advantages of the technique according to the disclosure will become apparent from the following descriptions of the embodiments which are exemplary and non-limiting and which are given with reference to the accompanying drawings.

BEST MODES

An embodiment of a hydraulic control device will be described with reference to the drawings. In the embodiment, a hydraulic control device 1 provided in an automatic transmission device 9 for a vehicle will be described as an example. The hydraulic control device 1 according to the embodiment is provided to control hydraulic pressure supplied to hydraulic driving elements mounted on the automatic transmission device 9.

Figure 1:
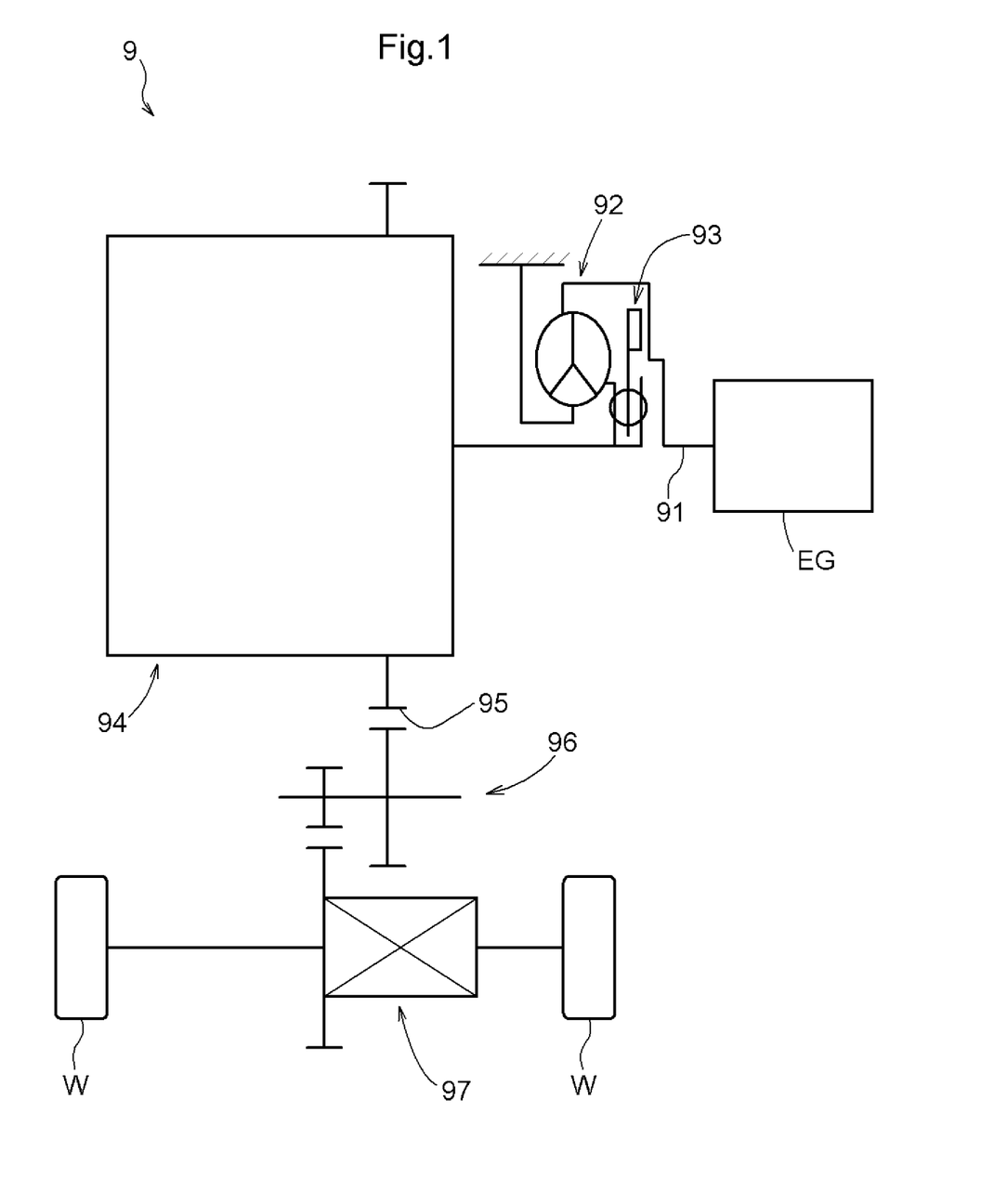
FIG. 1 is a schematic diagram of an automatic transmission device according to an embodiment.

As shown in FIG. 1, the automatic transmission device 9 has an input member 91, a fluid coupling 92 that has a lockup clutch 93, a speed change mechanism 94, and an output member 95. Additionally, the automatic transmission device 9 has a counter gear mechanism 96 and an output differential gear mechanism 97. These are housed in a case (driving gear case) that is not shown.

The input member 91 is coupled to an internal combustion engine EG so that the input member 91 can transmit a driving force (hereinafter simply referred to as "drivingly coupled"). The fluid coupling 92 is drivingly coupled to the input member 91 and the speed change mechanism 94. The fluid coupling 92 of the embodiment is a torque converter that has a pump impeller drivingly coupled to the input member 91, a turbine runner drivingly coupled to the speed change mechanism 94, and a stator disposed between the pump impeller and the turbine runner, for example. The fluid coupling 92 may be a fluid coupling that only has the pump impeller and the turbine runner. The fluid coupling 92 transmits a torque of the internal combustion engine EG that is input to the input member 91 to the speed change mechanism 94, by fluid transmission via working oil in the fluid coupling, while the lockup clutch 93 is disengaged. When the lockup clutch 93 is engaged, the torque of the internal combustion engine EG that is input to the input member 91 is transmitted to the speed change mechanism 94 as it is. The lockup clutch 93 is structured to be hydraulically driven.

The speed change mechanism 94 changes the speed of the output rotation of the fluid coupling 92 input to the speed change mechanism 94, and transmits the rotation to the output member 95. The speed change mechanism 94 may be a stepped speed change mechanism that changes the speed of the input rotation at the speed ratio corresponding to one of the plurality of shift speeds and transmits the rotation to the output member 95. The speed change mechanism 94 may also be a continuously variable speed change mechanism that changes the speed of the input rotation in a stepless manner and transmits the rotation to the output member 95. Additionally, the speed change mechanism 94 may be a fixed ratio speed change mechanism that changes the speed of the input rotation at a predetermined fixed speed ratio and transmits the rotation to the output member 95. In this case, the fixed ratio speed change mechanism may be a forward/reverse travel switching-type fixed ratio speed change mechanism in which the speed ratio for forward travel and the speed ratio for reverse travel are set separately (forward/reverse travel switching mechanism). The speed change mechanism 94 may also include both the continuously variable speed change mechanism and any one of the stepped speed change mechanism, the fixed ratio speed change mechanism, and the forward/reverse travel switching mechanism.

If the speed change mechanism 94 includes the stepped speed change mechanism, the stepped speed change mechanism has a plurality of shift engagement devices. If the speed change mechanism 94 includes the continuously variable speed change mechanism, the continuously variable speed change mechanism has a pair of movable sheaves. If the speed change mechanism 94 includes the forward/reverse travel switching mechanism, the forward/reverse travel switching mechanism has an engagement device for forward/reverse travel switching. The shift engagement devices, the movable sheaves, and the engagement device for forward/reverse travel switching that may be included in the speed change mechanism 94 are structured to be hydraulically driven.

The output member 95 is drivingly coupled to a pair of left and right wheels W via the counter gear mechanism 96 and the output differential gear mechanism 97.

The hydraulic control device 1 is used to control hydraulic pressure supplied to the hydraulic driving elements of the automatic transmission device 9 (specifically, the lockup clutch 93, and the shift engagement devices, the movable sheaves, and the engagement device for forward/reverse travel switching etc. that are provided in the speed change mechanism 94). The hydraulic control device 1 regulates the oil discharged from a first pump P1 and a second pump P2 (see FIG. 2) to a prescribed hydraulic pressure and supplies the regulated hydraulic pressure to the hydraulic driving elements of the automatic transmission device 9. In the embodiment, the first pump P1 is a mechanical oil pump driven by the internal combustion engine EG that is drivingly coupled to the input member 91. The second pump P2 is an electric oil pump that is driven by a motor for a pump dedicated to the second pump P2, which is different from the internal combustion engine EG. The first pump P1 and the second pump P2 suck the oil (working oil, ATF; automatic transmission fluid) from the oil pan provided on the lower portion of the case and increase the hydraulic pressure of the oil to the prescribed hydraulic pressure to discharge the oil.

Figure 2:
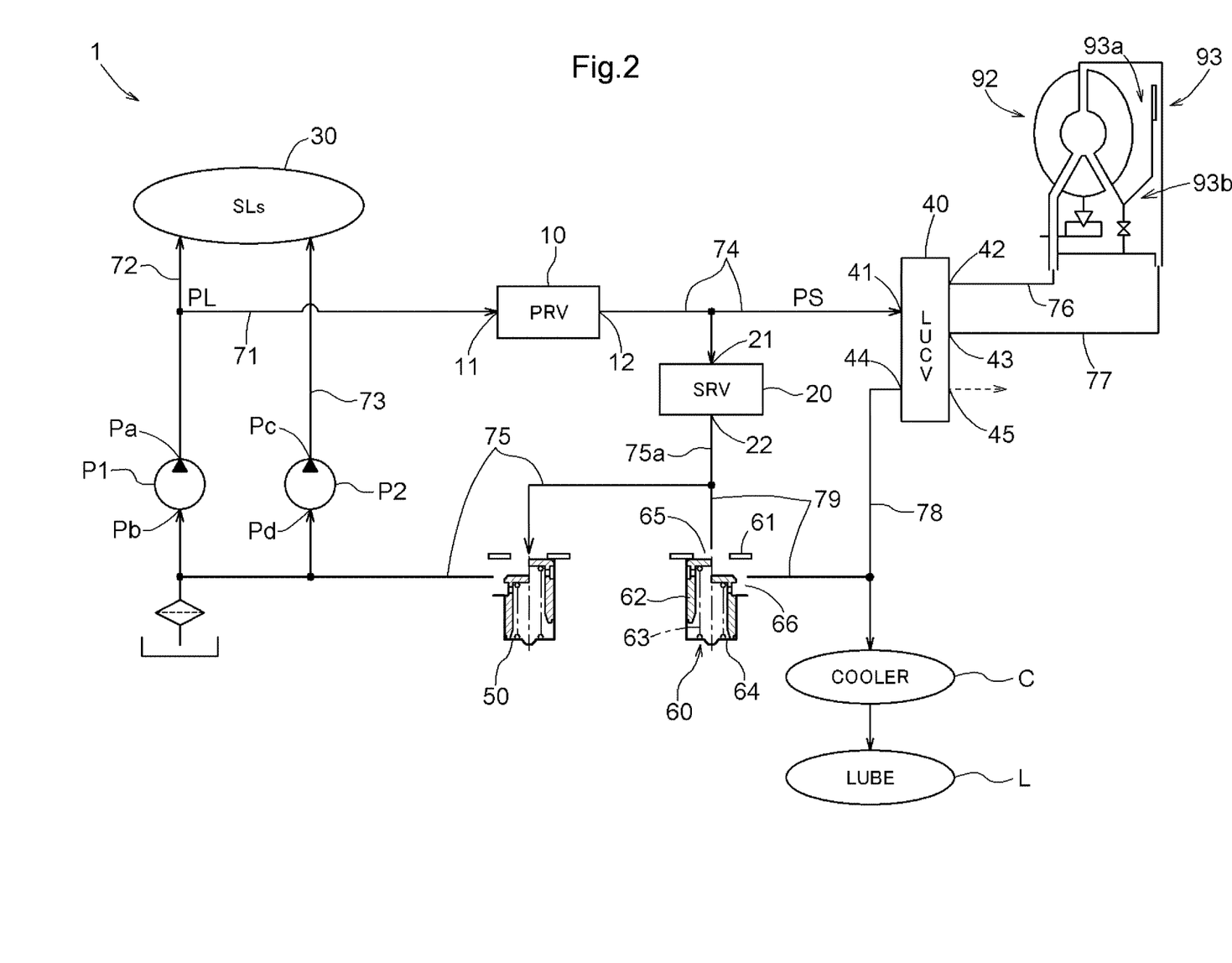
FIG. 2 is a circuit diagram of a hydraulic control device.

As shown in FIG. 2, the hydraulic control device 1 has a first pressure regulation valve 10, a second pressure regulation valve 20, a shift control unit 30, a selector valve 40, a check valve 50, and a flow direction regulation valve 60. Additionally, the hydraulic control device 1 is connected to the first pump P1, the second pump P2, the hydraulic driving elements that include the lockup clutch 93, an oil cooler C, and a location to be lubricated L.

An input port 11 of the first pressure regulation valve 10 is connected to a discharge port Pa of the first pump P1 via a first oil passage 71. The first pressure regulation valve 10 is formed of a relief-type reducing valve. The first pressure regulation valve 10 regulates hydraulic pressure supplied from the first pump P1 so as to regulate the upstream hydraulic pressure of the first pressure regulation valve 10 to a line pressure PL. The first pressure regulation valve 10 discharges the excess oil after regulation from a drain port 12. The first oil passage 71 is connected to the shift control unit 30 via a second oil passage 72 and the line pressure PL generated at the first pressure regulation valve 10 is supplied to the shift control unit 30. In the embodiment, an output port Pc of the second pump P2 is also connected to the shift control unit 30 via a third oil passage 73.

The structure of the shift control unit 30 is set in accordance with the specific structures of the speed change mechanism 94. For example, when the speed change mechanism 94 includes the stepped speed change mechanism, the shift control unit 30 includes a linear solenoid valve that regulates hydraulic pressure supplied to hydraulic servos of the shift engagement devices provided in the stepped speed change mechanism. When the speed change mechanism 94 includes the continuously variable speed change mechanism, the shift control unit 30 includes a linear solenoid valve that regulates hydraulic pressure supplied to hydraulic servos of the pair of movable sheaves provided in the continuously variable speed change mechanism.

An input port 21 of the second pressure regulation valve 20 is connected to the drain port 12 of the first pressure regulation valve 10 via a fourth oil passage 74. The second pressure regulation valve 20 is formed of a relief-type reducing valve. The second pressure regulation valve 20 regulates hydraulic pressure of oil drained from the first pressure regulation valve 10 so as to regulate the upstream hydraulic pressure of the second pressure regulation valve 20 to a secondary pressure PS. The second pressure regulation valve 20 discharges the excess oil after regulation from a drain port 22. The fourth oil passage 74 is branched and is also connected to an input port 41 of the selector valve 40. The secondary pressure PS generated at the second pressure regulation valve 20 is supplied to the fluid coupling 92 via the selector valve 40. In this way, the second pressure regulation valve 20 regulates hydraulic pressure of the oil supplied from the first pump P1 and drained from the first pressure regulation valve 10 during regulation (during generation of line pressure PL), and supplies the oil after regulation to the fluid coupling 92 via the selector valve 40. In the embodiment, the first pump P1 corresponds to the "oil pump" and the second pressure regulation valve 20 corresponds to the "pressure regulation valve".

The drain port 22 of the second pressure regulation valve 20 is connected to a suction port Pb of the first pump P1 and a suction port Pd of the second pump P2 via a fifth oil passage 75. The oil drained from the second pressure regulation valve 20 during pressure regulation (during generation of secondary pressure PS) returns to the first pump P1 and the second pump P2 through the fifth oil passage 75. In the embodiment, the fifth oil passage 75 corresponds to the "return oil passage". By returning the clean oil that was just drained by the first pressure regulation valve 10 and the second pressure regulation valve 20 to the first pump P1 and the second pump P2, the discharge efficiency of the pumps P1, P2 is increased and the fuel efficiency of the vehicle on which the automatic transmission device 9 is mounted is improved. The check valve 50 is provided on the fifth oil passage 75.

The check valve 50 is structured to open when hydraulic pressure on the second pressure regulation valve 20 side becomes equal to or higher than a first set pressure. In the embodiment, the first set pressure of the check valve 50 is set to a pressure that is higher than a set differential pressure of the flow direction regulation valve 60. Thus, the check valve 50 opens when the amount of oil drained from the second pressure regulation valve 20 exceeds the amount of oil that can be supplied to the oil cooler C and the location to be lubricated L via a ninth oil passage 79 and thus hydraulic pressure on the drain port 22 side of the second pressure regulation valve 20 becomes high. The excess oil is then returned to the first pump P and the second pump P2 via the fifth oil passage 75. When the amount of oil drained from the second pressure regulation valve 20 is small, the check valve 50 is kept closed and all of the oil drained from the second pressure regulation valve 20 is supplied to the oil cooler C and the location to be lubricated L.

The selector valve 40 has the input port 41, a first output port 42, a second output port 43, a lubrication port 44, a drain port 45, and a spool (not shown) provided to be freely slidable in the axial direction. The input port 41 is connected to the fourth oil passage 74 as described above. The first output port 42 is connected to an engagement side oil chamber 93a of the lockup clutch 93 via a sixth oil passage 76. The second output port 43 is connected to a disengagement side oil chamber 93b of the lockup clutch 93 via a seventh oil passage 77. The lubrication port 44 is connected to the oil cooler C and the location to be lubricated L via an eighth oil passage 78. The drain port 45 is in communication with the oil pan.

Figure 3:
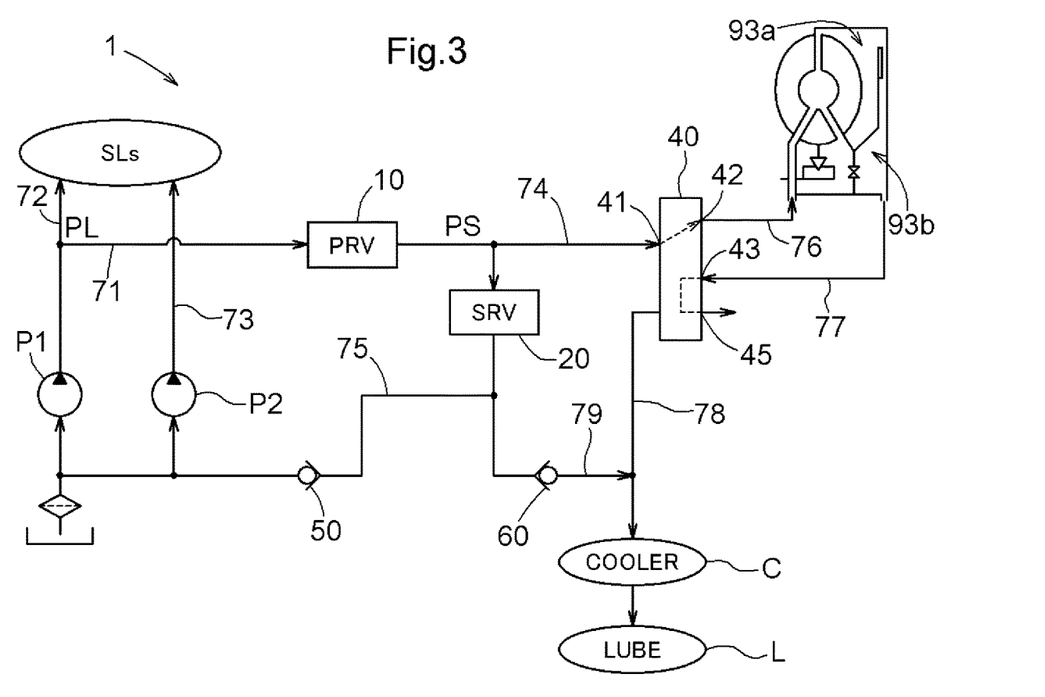
FIG. 3 is a schematic diagram of the flow of working oil when the lockup clutch is engaged.

When the lockup clutch 93 is engaged, the spool of the selector valve 40 allows communication between the input port 41 and the first output port 42 and also allows communication between the second output port 43 and the drain port 45, as shown schematically in FIG. 3. The oil under secondary pressure PS that is supplied from the fourth oil passage 74 is supplied to engagement side oil chamber 93a of the lockup clutch 93 through the sixth oil passage 76. As a result, hydraulic pressure in the engagement side oil chamber 93a increases compared to hydraulic pressure in the disengagement side oil chamber 93b and thus the lockup clutch 93 is engaged due to the increase in differential pressure. The oil discharged from the disengagement side oil chamber 93b returns to the selector valve 40 through the seventh oil passage 77 and is drained from the drain port 45.

Figure 4:
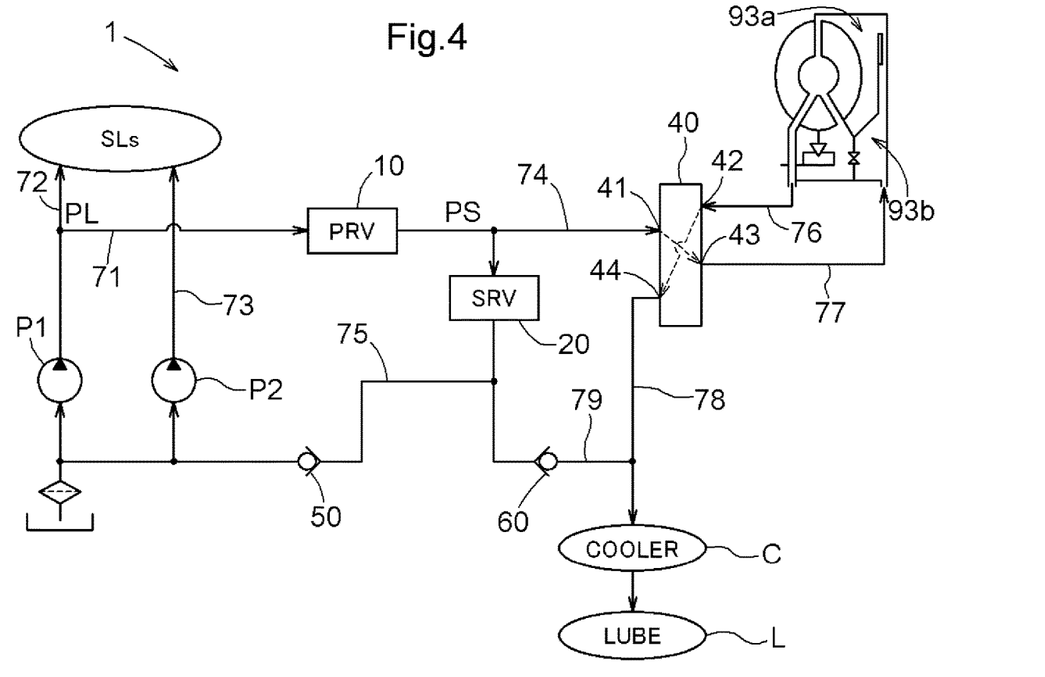
FIG. 4 is a schematic diagram of the flow of the working oil when the lockup clutch is disengaged.

When the lockup clutch 93 is disengaged, the spool of the selector valve 40 allows communication between the input port 41 and the second output port 43 and also allows communication between the first output port 42 and the lubrication port 44, as shown schematically FIG. 4. The, the oil under secondary pressure PS that is supplied from the fourth oil passage 74 is supplied to the disengagement side oil chamber 93b of the lockup clutch 93 through the seventh oil passage 77. As a result, hydraulic pressure in the engagement side oil chamber 93a and hydraulic pressure in the disengagement side oil chamber 93b are equalized and thus the lockup clutch 93 is disengaged due to the decrease in differential pressure. At this time, the oil discharged from the engagement side oil chamber 93a returns to the selector valve 40 through the sixth oil passage 76 and is then supplied to the oil cooler C and the location to be lubricated L through the eighth oil passage 78.

The oil cooler C has a heat exchanger and cools the oil that flows through the oil cooler C. The location to be lubricated L is a part in the automatic transmission device 9 that needs to be lubricated. For example, the location to be lubricated L may be a meshing portion of gears for transmitting driving force or a bearing for rotatably supporting various rotary members etc. In the embodiment, the location to be lubricated L includes a part in the automatic transmission device 9 that need to be cooled. An example of the part that needs to be cooled is a friction material of friction engagement devices. The location to be lubricated L is not limited to the part in the automatic transmission device 9 and may be a part along the path of the various oil passages such as the fifth oil passage 75 and the sixth oil passage 76 etc. that needs to be lubricated.

In the embodiment, the sixth oil passage 76, in which the oil discharged from the fluid coupling 92 when the lockup clutch 93 is disengaged flows through, corresponds to the "discharge oil passage". Additionally, the eighth oil passage 78 that supplies oil from the sixth oil passage 76, which is the "discharge oil passage" to the location to be lubricated L corresponds to the "lubrication oil passage".

As shown in FIG. 2, according to one characteristic of the hydraulic control device 1 of the embodiment, the ninth oil passage 79 is disposed so as to be connected to the fifth oil passage 75 that is the "return oil passage" and the eighth oil passage 78 that is the "lubrication oil passage". In the embodiment, the ninth oil passage 79 is directly connected to the fifth oil passage 75. In other words, the fifth oil passage 75 and the ninth oil passage 79 are both connected to the drain port 22 of the second pressure regulation valve 20 via a part of the fifth oil passage 75 on the second pressure regulation valve 20 side (part represented by the symbol "75a" in FIG. 2). In the embodiment, the ninth oil passage 79 corresponds to the "connection oil passage" and the part 75a of the fifth oil passage 75 on the second pressure regulation valve 20 side corresponds to the "common oil passage". Since the ninth oil passage 79 is provided, the oil drained from the second pressure regulation valve 20 can be supplied to the oil cooler C and the location to be lubricated L via the ninth oil passage 79 and the eighth oil passage 78.

However, since the ninth oil passage 79 is provided, the lubrication port 44 of the selector valve 40 will also be in communication with the fifth oil passage 75 that is the "return oil passage" if there is no change. Additionally, when the lockup clutch 93 is disengaged, oil discharged from the fluid coupling 92 flows through the lubrication port 44 of the selector valve 40. However, for example, when the vehicle is started after being stopped for a long time, there is a case in which the amount of oil in the fluid coupling 92 (including the engagement side oil chamber 93a and the disengagement side oil chamber 93b) decreases and air remains in the fluid coupling 92. Thus, when the ninth oil passage 79 is provided to connect the fifth oil passage 75 and the eighth oil passage 78, there is a possibility that the air in the fluid coupling 92 will go through the oil passages and enter the suction port Pb of the first pump P1 and the suction port Pd of the second pump P2.

Here, according to another characteristic of the hydraulic control device 1 of the embodiment, the flow direction regulation valve 60 is provided in the ninth oil passage 79. The flow direction regulation valve 60 has a plate 61, a valve 62, a spring 63 that urges the valve 62 towards the plate 61, and a housing 64 that houses the valve 62 and the spring 63 between the plate 61 and the housing 64. A first port 65 formed on the plate 61 is in communication with the fifth oil passage 75. A second port 66 formed on a side surface of the housing 64 is in communication with the eighth oil passage 78. When the flow direction regulation valve 60 is in a mounted state (initial state), the valve 62 and the plate 61 are in close contact with each other due to the urging force of the spring 63 and thus the first port 65 is closed. When pressure that exceeds the urging force of the spring 63 is applied to the first port 65 side, the valve 62 moves so as to separate from the plate 61 against the urging force of the spring 63. Thus, the first port 65 and the second port 66 are in communication with each other. In the embodiment, the "set differential pressure" is determined by the urging force of the spring 63.

When hydraulic pressure on the fifth oil passage 75 side is higher than hydraulic pressure on the eighth oil passage 78 side by a differential pressure that is higher than the set differential pressure, the flow direction regulation valve 60 allows communication between the eighth oil passage 78 and the fifth oil passage 75. For example, when the lockup clutch 93 is engaged, the engagement side oil chamber 93a is filled with the oil and the amount of oil discharged from the fluid coupling 92 is restricted, which increases the amount of oil drained from the second pressure regulation valve 20 for generating the secondary pressure PS. Thus, hydraulic pressure on the fifth oil passage 75 side becomes relatively high. The oil discharged from the disengagement side oil chamber 93b is drained by the selector valve 40 and does not flow into the eighth oil passage 78. Thus, hydraulic pressure on the eighth oil passage 78 side becomes low. Thus, when the lockup clutch 93 is engaged, differential pressure between hydraulic pressure on the fifth oil passage 75 side and hydraulic pressure on the eighth oil passage 78 side typically becomes higher than the set differential pressure. Therefore, the flow direction regulation valve 60 opens and allows communication. As a result, the oil drained from the second pressure regulation valve 20 flows into the eighth oil passage 78 via the ninth oil passage 79 and the flow direction regulation valve 60 that allows communication. Then, the oil is cooled in the oil cooler C to be supplied to the location to be lubricated L.

When the differential pressure of hydraulic pressure on the fifth oil passage 75 side and hydraulic pressure on the eighth oil passage 78 side is lower than the set differential pressure, the flow direction regulation valve 60 blocks communication between the eighth oil passage 78 and the fifth oil passage 75. For example, when the lockup clutch 93 is disengaged, the amount of oil drained from the second pressure regulation valve 20 to generate the secondary pressure PS decreases since the oil flows through the fluid coupling 92 and the lockup clutch 93. Thus, hydraulic pressure on the fifth oil passage 75 side becomes relatively low. The oil discharged from the fluid coupling 92 flows through the sixth oil passage 76 and the eighth oil passage 78. Thus, hydraulic pressure on the eighth oil passage 78 side becomes high. While the vehicle is stopped (while the internal combustion engine EG is stopped), the oil is not drained from the second pressure regulation valve 20 since the first pump P1 is not driven. Thus, hydraulic pressure on the fifth oil passage 75 side becomes low.

In this way, hydraulic pressure on the eighth oil passage 78 side becomes higher than hydraulic pressure on the fifth oil passage 75 side, and the differential pressure between them is lower than the set differential pressure. Thus, the flow direction regulation valve 60 closes so that communication is blocked. In this case, it is possible to separate the eighth oil passage 78 that is in communication with the engagement side oil chamber 93a and the disengagement side oil chamber 93b of the lockup clutch 93 from the fifth oil passage 75 that is in communication with the first pump P1 and the second pump P2. Thus, even if air remains in the engagement side oil chamber 93a and the disengagement side oil chamber 93b while the vehicle is stopped (while the internal combustion engine EG is stopped) for a long time, it is possible to avoid the remaining air from going through the fifth oil passage 75 and flowing into the first pump P1 and the second pump P2. Thus, air inclusion in the first pump P1 and the second pump P2 can be avoided. Therefore, a decrease in discharge efficiency and generation of an abnormal noise in the pumps P1, P2 can be avoided.

Other Embodiments (1) In the embodiment described above, a structure was described as an example, in which the first pressure regulation valve 10 and the second pressure regulation valve 20 are provided, secondary pressure PS generated in the second pressure regulation valve 20 is supplied to the fluid coupling 92, and the drain oil from the second pressure regulation valve is returned to the pumps P1, P2. However, the invention is not limited to such a structure. The second pressure regulation valve 20 does not have to be provided, line pressure PL generated in the first pressure regulation valve 10 may be supplied to the fluid coupling 92, and the drain oil from the first pressure regulation valve 10 may be returned to the pumps P1, P2. In this structure, the first pressure regulation valve 10 corresponds to the "pressure regulation valve".

(2) In the embodiment described above, the check valve may be provided upstream of the oil cooler C in the eighth oil passage 78 that is the lubrication oil passage and connected in series to the oil cooler C. The check valve opens when hydraulic pressure on the selector valve 40 side becomes equal to or higher than the set pressure and closes when hydraulic pressure on the selector valve 40 side becomes lower than the set pressure. With this check valve, it is possible to suppress leakage of the oil from the fluid coupling 92 when the vehicle is stopped or in other cases where there is no drain oil from the second pressure regulation valve 20 and no discharge oil from the fluid coupling 92. Thus, the amount of air generated in the fluid coupling 92 can be suppressed while the vehicle is stopped (while the internal combustion engine EC is stopped) for a long time.

(3) In the embodiment described above, a structure is described as an example, in which the electric second pump P2 driven by the motor for the pump that is dedicated to the second pump P2 is provided in addition to the mechanical first pump P1 driven by the internal combustion engine EG. However, the invention is not limited to such a structure, and the second pump P2 does not have to be provided. In this case, the oil that flows through the fifth oil passage 75 that is the return oil passage is entirely returned to the suction port Pb of the first pump P1.

(4) In the embodiment described above, a structure was described as an example, in which the fifth oil passage 75 and the ninth oil passage 79 are connected to the common drain port 22 of the second pressure regulation valve 20. However, the invention is not limited to such a structure, and the fifth oil passage 75 and the ninth oil passage 79 may be separately connected to the individual drain ports 22 that are dedicated to the fifth oil passage 75 and the ninth oil passage 79 and provided in the second pressure regulation valve 20. In this structure, it can be said that the ninth oil passage 79 connects the fifth oil passage 75 and the eighth oil passage 78 via the second pressure regulation valve 20.

(5) In the embodiment described above, a structure was described as an example, in which the first pump P1 and the second pump P2 are, respectively, equipped with the discharge ports Pa, Pc, with the first pressure regulation valve 10 equipped with the input port 11 and the drain port 12, and the second pressure regulation valve 20 equipped with the input port 21 and the drain port 22. However, the invention is not limited to such a structure, and may be structured so that each of the first pump P and the second pump P2 has a plurality of the discharge ports Pa, Pc. Additionally, an alternate embodiment may be structured so that the first pressure regulation valve 10 has a plurality of the input ports 11 and a plurality of the drain ports 12 (specifically, the same number as the discharge ports Pa), and the second pressure regulation valve 20 has a plurality of the input ports 21 and a plurality of the drain ports 22 (specifically, the same number as the discharge ports Pc).

(6) The structures disclosed in the above embodiments (including the embodiments and the other embodiments described above; the same applies hereinafter) may be applied combined with the structures disclosed in the other embodiments as long as no inconsistency arises. Regarding other structures as well, the embodiments disclosed in the specification are shown by way of example in all respects, and various modifications may be made as appropriate without departing from the spirit and scope of the disclosure.

Summary of Embodiments

Based on the above description, the hydraulic control device according to the disclosure preferably includes the following structures.

The hydraulic control device (1) which controls hydraulic pressure supplied to the automatic transmission device (9) provided with the fluid coupling (92) that has the lockup clutch (93), the hydraulic control device (1) including: the pressure regulation valve (20) that regulates a hydraulic pressure oil supplied from the oil pump (P1) and supplies the oil to the fluid coupling (92); the discharge oil passage (76) through which oil discharged from the fluid coupling (92) flows when the lockup clutch (93) is disengaged; the lubrication oil passage (78) that supplies oil from the discharge oil passage (76) to the location to be lubricated (L) in the automatic transmission device (9); the return oil passage (75) that returns oil drained from the pressure regulation valve (20) during pressure regulation to the suction port (Pb) of the oil pump (P1); the connection oil passage (79) that connects the lubrication oil passage (78) and the return oil passage (75); and the flow direction regulation valve (60) that is provided in the connection oil passage (79), and that allows communication between the lubrication oil passage (78) and the return oil passage (75) when hydraulic pressure on the return oil passage (75) side is higher than hydraulic pressure on the lubrication oil passage (78) side by the pressure that is equal to or higher than the set differential pressure, and blocks communication between the lubrication oil passage (78) and the return oil passage (75) when differential pressure between hydraulic pressure on the return oil passage (75) side and hydraulic pressure on the lubrication oil passage (78) side is lower than the set differential pressure.

In this structure, when the lockup clutch (93) is disengaged and the oil discharged from the fluid coupling (92) flows through the discharge oil passage (76), the differential pressure between hydraulic pressure on the return oil passage (75) side and hydraulic pressure on the lubrication oil passage (78) side becomes lower than the set differential pressure. Thus, it is possible to separate the discharge oil passage (76) and the lubrication oil passage (78) that are in communication with the fluid coupling (92) from the return oil passage (75) that is in communication with the oil pump (P1), since the flow direction regulation valve (60) blocks communication. Therefore, even if air is mixed in the oil that is discharged from the fluid coupling (92), it is possible to make the oil mixed with air only flow through the lubrication oil passage (78) so that inflow of air into the suction port (Pb) of the oil pump (P1) can be avoided. When the oil from the fluid coupling (92) does not flow through the discharge oil passage (76) and hydraulic pressure on the return oil passage (75) side is higher than hydraulic pressure on the lubrication oil passage (78) side by a pressure that is equal to or higher than the set differential pressure, the flow direction regulation valve (60) is opened. Thus, the oil drained from the pressure regulation valve (20) can be supplied to the lubrication oil passage (78). In this case, it is possible to return a part of the oil drained from the pressure regulation valve (20) to the suction port (Pb) of the oil pump (P1) via the return oil passage (75).

As one aspect, it is preferable that the return oil passage (75) and the connection oil passage (79) are connected to the drain port (22) of the pressure regulation valve (20) via the common oil passage (75a).

In this structure, there is no need to provide the drain ports that are each dedicated to the return oil passage (75) and the connection oil passage (79). Thus, it is possible to suppress an increase in size of the pressure regulation valve (20) and suppress an increase in size of the whole hydraulic control device (1).

The "common oil passage" does not necessarily have to be an independent oil passages and may be a part of the return oil passage (75).

As one aspect, it is preferable that when the lockup clutch (93) is engaged, the oil discharged from the fluid coupling (92) is drained and the oil drained from the pressure regulation valve (20) is supplied to the location to be lubricated (L) via the connection oil passage (79) and the flow direction regulation valve (60) that allows communication.

In this structure, when the lockup clutch (93) is engaged, the oil discharged from the fluid coupling (92) is drained and not supplied to the lubrication oil passage (78). Thus, hydraulic pressure on the return oil passage (75) side becomes higher than hydraulic pressure on the lubrication oil passage (78) side by the pressure that is higher than the set differential pressure and the flow direction regulation valve (60) allows communication. The location to be lubricated (L) can then be lubricated appropriately due to the drain oil from the pressure regulation valve (20), which flows into the lubrication oil passage (78) via the flow direction regulation valve (60) that allows communication.

The hydraulic control device according to the disclosure should be able to accomplish at least one of the effects described above.

DESCRIPTION OF THE REFERENCE NUMERALS

1 Hydraulic control device
9 Automatic transmission device
20 Second pressure regulation valve (Pressure regulation valve)
22 Drain port
40 Selector valve
60 Flow direction regulation valve
75 Fifth oil passage (Return oil passage)
75a Second pressure regulation valve side portion of fifth oil passage (Common oil passage)
76 Sixth oil passage (Discharge oil passage)
78 Eighth oil passage (Lubrication oil passage)
79 Ninth oil passage (Connection oil passage)
92 Fluid coupling
93 Lockup clutch
P1 First pump (Oil pump)
Pb Suction port
L Location to be lubricated

The invention claimed is:

1. A hydraulic control device which controls hydraulic pressure supplied to an automatic transmission provided with a fluid coupling that has a lockup clutch, the hydraulic control device comprising:

a pressure regulation valve configured to regulate a hydraulic pressure of oil supplied from an oil pump and supply the oil to the fluid coupling;

a discharge oil passage through which the oil discharged from the fluid coupling flows when the lockup clutch is disengaged;

a lubrication oil passage that supplies the oil from the discharge oil passage to a location to be lubricated in the automatic transmission;

a return oil passage that returns the oil drained from the pressure regulation valve during pressure regulation to a suction port of the oil pump;

a connection oil passage that connects the lubrication oil passage and the return oil passage; and a flow direction regulation valve that is provided in the connection oil passage, and that allows communication between the lubrication oil passage and the return oil passage when hydraulic pressure on the return oil passage side is higher than hydraulic pressure on the lubrication oil passage side by a pressure that is equal to or higher than a set differential pressure, and blocks communication between the lubrication oil passage and the return oil passage when differential pressure between hydraulic pressure on the return oil passage side and hydraulic pressure on the lubrication oil passage side is lower than the set differential pressure.

2. The hydraulic control device according to claim 1, wherein
the return oil passage and the connection oil passage are connected to a drain port of the pressure regulation valve via a common oil passage.

3. The hydraulic control device according to claim 1, wherein
when the lockup clutch is engaged, the oil discharged from the fluid coupling is drained and the oil drained from the pressure regulation valve is supplied to the location to be lubricated via the connection oil passage and the flow direction regulation valve that allows communication.

4. The hydraulic control device according to claim 2, wherein
when the lockup clutch is engaged, the oil discharged from the fluid coupling is drained and the oil drained from the pressure regulation valve is supplied to the location to be lubricated via the connection oil passage and the flow direction regulation valve that allows communication.

* * * * *